United States Patent Office 3,256,526
Patented June 14, 1966

3,256,526
DECAPEPTIDES
Robert Schwyzer, Riehen, Heini Kappeler, Birsfelden, and Beat Iselin, Riehen, Switzerland, assignors to Ciba Corporation, a corporation of Delaware
No Drawing. Filed June 5, 1961, Ser. No. 114,636
Claims priority, application Switzerland, June 3, 1960, 6,400/60
4 Claims. (Cl. 260—112.5)

This invention relates to the manufacture of new decapeptides of the formula L-seryl-L-trosyl-L-seryl-L-α-mercapto - lower alkyl - α - aminoacetyl - L-glutaminyl-L - histidyl-L-phenylalanyl-L-α-amino-lower alkyl - α-aminoacetyl-L-tryptophylglycine, whose mercapto group is unsubstituted or substituted by a lower alkyl radical, such as ethyl, propyl, but more particularly methyl, and of corresponding compounds which have the radical of glutamic acid instead of the glutamine radical, their derivatives and salts. By derivatives there are to be understood in particular functional derivatives, such as esters and amides and also N-substitution products, such as N-acyl derivatives, in particular N-acetyl derivatives and compounds having the conventional amino protective groups. The alkylene groups of the mercaptoalkyl and aminoalkyl radicals have 1–4, preferably 2–3, carbon atoms.

An L-α-mercapto-lower alkyl-α-aminoacetyl group is, for example, the radical of cysteine, homocysteine and their S-lower alkyl derivatives, such as methyl, ethyl or propyl derivatives, but especially the methionyl radical. By the radical of an L-α-amino-lower alkyl-α-aminoacetic acid there are to be understood in particular L-arginyl, L-ornithyl and L-lysyl.

The new compounds have the action of the natural Melanocytes-stimulating hypophysis hormone (MSH effect). In particular, however, they have an action stimulating the secretion of the adrenocorticotropic hormone (ACTH) from the antehypophysis (corticotropin releasing factor=CRF effect) and are accordingly intended to be employed as medicaments. Furthermore, they may be employed as intermediate products for manufacturing medicaments having a longer chain of amino acids, such as the Melanocytes-stimulating hormone and of the ACTH. Outstanding as regards the CRF effect is, in particular, L - seryl - L - tyrosyl - L - seryl-L-methionyl - L - glutaminyl - L - histidyl - L - phenylalanyl-L-arginyl-L-tryptophylglycine of the formula

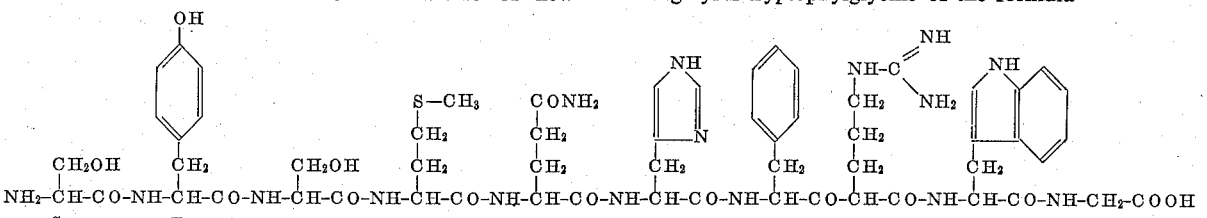

and the corresponding glutamyl compound.

The new peptides are obtained by the methods known for the manufacture of peptides, the amino acids being linked separately in the sequence mentioned or after previous formation of smaller peptide units. Thus, it is possible to link one of the amino acid or peptide molecules in the form of an ester with another amino acid molecule or peptide molecule containing a protected amino group in the presence of a condensing agent, such as a carbodiimide or a phosphorous acid ester halide, or it is possible to react with the amino acid ester or peptide ester having a free amino group an amino acid or a peptide having an activated carboxyl group (and protected amino group), for example an acid halide, azide, anhydride, imidazolide, or an activated ester, such as cyanomethyl ester or carboxymethyl thiol ester. Conversely, it is also possible to cause an amino acid or a peptide having a free carboxyl group (and protected amino group) to react with an amino acid or a peptide having an activated amino group (and protected carboxyl group), for example a phosphitamide. All the methods mentioned may be used for every formation of peptide bonds in question according to the invention, but the processes employed in the Examples are particularly advantageous.

As already mentioned, there are various possibilities as regards the building up of the decapeptide from the amino acids or smaller peptide units. One process, for example, consists in that the heptapeptide L-α-lower alkyl - α - aminoacetyl - L - glutaminyl- (or glutamyl)-L - histidyl - L - phenylalanyl - L - α - amino - lower alkyl - α - amino - acetyl - L - tryptophyl - L - glycine is condensed with the tripeptide L-seryl-L-tyrosyl-L-serine, for example according to the scheme:

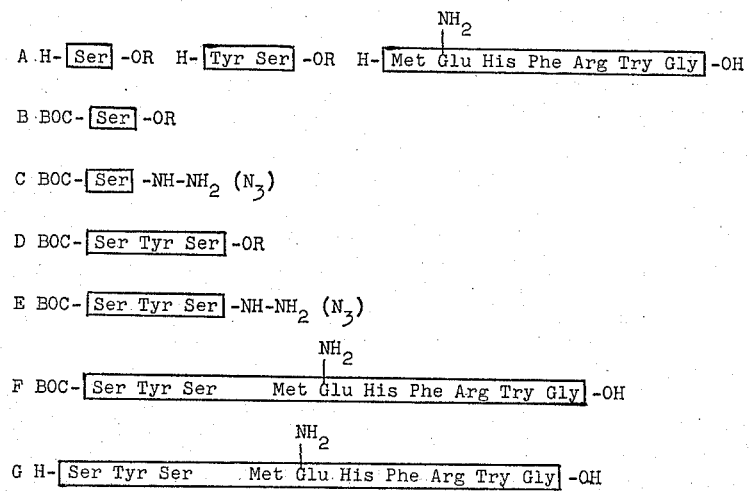

BOC signifies a tertiary butyloxycarbonyl group, OR an ester group. The heptapeptide employed as starting material may be prepared according to the process of U.S. patent application Serial No. 91,651 filed February 27, 1961, by Robert Schwyzer et al.

The decapeptides are moreover obtained when a hexapeptide of the formula L-glutaminyl- (or glutamyl)-L-histidyl - L - phenylalanyl - L - α - amino-lower-alkyl-α-amino-acetyl-L-tryptophyl-L-glycine is condensed with the tetrapeptide of the formula L-seryl-L-tyrosyl-L-seryl-L-methionine, for example according to the scheme

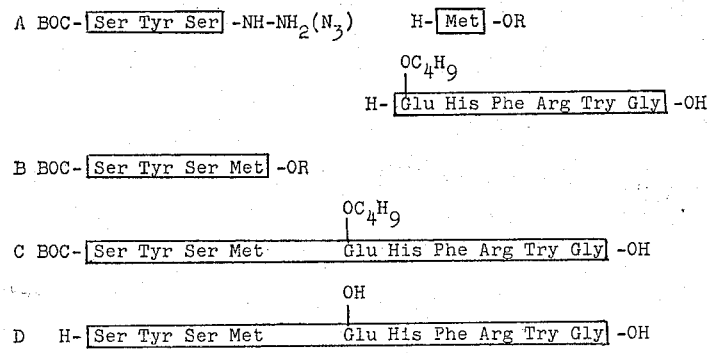

The hexapeptide employed as starting material may be prepared according to the process of U.S. patent application Serial No. 822,187 filed June 23, 1959, by Robert Schwyzer et al., now U.S. Patent 3,093,627.

Moreover, it is possible to condense an octapeptide of the formula L-seryl-L-methionyl-L-glutaminyl- (or glutamyl)-L-histidyl-L-phenylalanyl-L-α-amino-lower alkyl-α-amino-acetyl-L-tryptophyl-glycine, for example, Ser-Met-Glu (NH$_2$)-His-Phe-Arg-Try-Gly (Am. Soc. vol. 79, 6087 [1957]) with the dipeptide Ser-Tyr (J. Am. Chem. Soc., vol 79, 1636 [1957]) or a pentapeptide of the formula L-seryl-L-tryosyl-L-seryl-L-α-mercapto-lower akyl-α-amino-acetyl-L-glutamine (or glutamic acid), for example Ser-Tyr-Ser-Met-Glu(NH$_2$) (J. Am. Chem. Soc., vol. 79, 1636 [1957]) with a pentapeptide of the formula L-histidyl-L-phenylalanyl-L-α-amino-lower alkyl-α - amino-acetyl-L-tryptophyl-glycine, for example His-Phe-Arg-Try-Gly (Nature, vol. 182, 1669 [1958]).

Free, functional groups not participating in the reaction are advantageously protected, in particular by means of radicals which can be split off easily by hydrolysis or reduction, the carboxyl group preferably by esterification, for example with a lower alkanol, for instance, methanol or a lower aralkanol, for instance, benzyl alcohol, p-nitrobenzyl alcohol, the amino group, for example, by incorporation of the tosyl radical or trityl radical or of the carbobenzoxy group or of colored protective groups, such as the p-phenylazo-benzyloxycarbonyl group and the p-(p'-methoxyphenylazo)-benzyloxycarbonyl group (MZ), or in particular of the tertiary butyloxycarbonyl radical, the mercapto group by the benzyl group. The nitro group is suitable for protecting the amino group in the guanido grouping of the arginine, said amino group of the arginine, however, need not necessarily be protected during the reaction.

The conversion of a protective SH group or NH$_2$ group into a free group and the transformation of a functionally modified carboxyl group into a free carboxyl group in the course of the process for preparing the decapeptides and intermediate products are effected by method known per se by treatment with hydrolyzing or reducing agents.

The invention also relates to those embodiments of the process according to which a start is made from compounds obtainable as intermediate products at any stage of the process and the steps lacking are carried out or the process is broken off at any stage, and also to the intermediate products obtained in the course thereof.

Depending on the method of working, the new compounds are obtained in the form of bases or their acid addition salts. The bases may be obtained from the salts in manner known per se. From the bases, again, salts can be obtained by reaction with acids which are suitable for forming therapeutically usable salts, such as, for example, salts formed with inorganic acids such as hydrohalic acid, for example hydrochloric acids or hydrobromic acid, nitric acid, thiocyanic acid, sulfuric acid, phosphoric acid, or with organic acids, such as acetic acid, propionic acid, glycollic acid, lactic acid, pyroracemic acid, oxalic acid, malonic acid, succinic acid, maleic acid, fumaric acid, tartaric acid, citric acid, benzoic acid, cinnamic acid, salicylic acid, 2-phenoxybenzoic acid or 2-acetoxybenzoic acid, mandelic acid, methansulfonic acid, ethanesulfonic acid, hydroxyethanesulfonic acid, benzenesulfonic acid or toluenesulfonic acid.

The decapeptides obtained according to the process may be employed in the form of pharmaceutical preparations. These preparations contain the peptides in admixture with a pharmaceutical organic or iorganic carrier suitable for enteral, or parenteral administration. For making the carrier there are used substances which do not react with the polypeptides, such as, for example, gelatine, lactose, glucose, common salt, starch, magnesium stearate, talc, vegetable oils, benzyl alcohols, gums, polyalkylene glycol, petroleum jelly, cholesterol or other known carriers for medicaments. The pharmaceutica preparations may be in the form, for example, of tablets, dragees, powders, ointments, creams, suppositories or in liquid form as solutions, suspensions or emulsions. If desired, they are sterilized and/or contain auxiliary substances, such as preserving, stabilizing, wetting or emulsifying agents. They may also contain other therapeutically valuable substances.

The invention is described in the following examples. The temperatures are given in degrees centigrade. The following systems were used for the paper chromatography:

System 43=tertiary amyl alcohol:isopropanol:water =100:40:55
System 45=secondary butanol:3% ammonia=100:44
System 50=tertiary amyl alcohol:isopropanol:triethylamine:veronal:water=100:40:0.8:1.8 grams:50
System 54=secondary butanol:isopropanol:monochloroacetic acid:water=70:10:3 grams:40.

*Example 1.—t-Butyloxycarbonyl-L-serine methyl ester*

42.8 grams (0.3 mol) of t-butyloxycarbonyl azide are added to a solution of 19 grams (0.16 mol) of L-serine methyl ester (freshly prepared from 25 grams of ester hydrochloride) in 75 cc. of dry pyridine and the solution is allowed to stand for 24 hours at room temperature. The slightly yellow-colored reaction solution is concentrated in vacuo at 30° C. to a small volume, acetic ester is added thereto and the acetic ester solution is washed several times while cooling with ice with 1 N-hydrochloric acid, 1 N-sodium hydrogen carbonate solution and water, dried and concentrated in vacuo. The syrup obtained, after repeated extraction with petroleum ether (removal of excess t-butyloxycarbonyl azide), yields 27 grams (77%) of t-butyloxycarbonyl-L-serine methyl ester as oil which is directly further reacted.

Example 2.—t-Butyloxycarbonyl-L-serine hydrazide 27 grams of crude t-butyloxycarbonyl-L-serine methyl ester are dissolved in 200 cc. of methanol and 20 cc. of hydrazine hydrate are added. After 24 hours, the solution is concentrated in vacuo at a minimum temperature of 30° C. and the syrup obtained is kept in a high vacuum over concentrated sulfuric acid overnight to remove excess hydrazine. The solid residue is triturated with acetic ester and the isolated crystalline material is freed from traces of hydrazine at 0.01 mm. over sulfuric acid and recrystallized from acetic ester: 23.3 grams (86%); M.P. 112–114° C.; $[\alpha]_D^{27}$ —9.4°±1° (c.=4.06 in methanol).

Example 3.—t-Butyloxycarbonyl-L-seryl-L-tyrosyl-L-serine methyl ester

Example 3.—t-Butyloxycarbonyl-L-seryl-L-tyrosyl-L-serine methyl ester (a) *Starting from t-butyloxycarbonyl-L-serine hydrazide.*—11 grams (50 millimols) of t-butyloxycarbonyl-L-serine hydrazide are rapidly dissolved in 100 cc. of 1 N-hydrochloric acid previously cooled to —10° C. (containing 10 grams of sodium chloride to lower the freezing point) and a solution of 4.2 grams (60 millimols) of sodium nitrite in 15 cc. of water cooled to —10° C. is added thereto. After 5 minutes, the t-butyloxycarbonyl-L-serine azide separated out as oil is extracted twice using 150 cc of acetic ester each time (prevously cooled to —10° C.) and the ethyl acetate solution is washed with cold 1 N-sodium hydrogen carbonate solution and ice water, briefly dried over magnesium sulfate at 0.° C. and concentrated in vacuo at a maximum temperature of 20° C. to about 50 cc.

To the solution of the azide 14 grams (50 millimols) of freshly prepared L-tyrosyl-L-serine methyl ester (see Boissonnas, Helv, vol. 41, 1852 (1958); Skeggs, J. Exp. Med., vol. 108, 283 (1958)) are added to 0° C. in 50 cc. of dry tetrahydrofuran and the solution is allowed to stand for 48 hours at +5° C. The reaction solution is thereafter concentrated to a small volume in vacuo to remove tetrahydrofuran, diluted with ethyl acetate and washed at 0° C. with a little 1 N-hydrochloric acid, sodium hydrogen carbonate solution and water (in some mixtures part of the reaction product was precipitated during the washing and was filtered off), dried and evaporated in vacuo. The residue, on being triturated with ether, yields 14.7 grams (63%) of amorphous substance which is sufficiently pure for the following transformation into the hydrazide.

Recrystallization twice from a little acetone gives the pure crystalline t-butyloxycarbonyl-L-seryl-L-tyrosyl-L-serine methyl easter; M.P. 124–127° C.; $[\alpha]_D$ —23.6°±1° (c.=1.95 in methanol); difficulty soluble in ether, benzene, chloroform; soluble in hot ethyl acetate and hot water (on cooling, needles, M.P. 97–105° C., hydrate).

The splitting off of the t-butyloxycarbonyl group by means of hydrochloric acid in ethyl acetate or trifluoroacetic acid gives L-seryl-L-tyrosyl-L-serine metyl ester which is found to be pure by paper chromatography.

The L-tyrosyl-L-serine metyl ester used as starting material is prepared as follows:

16 grams (50 millimols) of L-tyrosyl-L-serine methyl ester hydrochloride [St. Guttmann and R. A. Boissonnas, Helv. Chem. Acta, vol. 41, 1852 (1958)] are suspended in 50 cc. of ethyl acetate and stirred at 0° C. with 12 cc. of a 5 N-solution of ammonia in methanol for 15 minutes. After adding another 50 cc. of ethyl acetate, the precipitated ammonium chloride is filtered off and the filtrate is carefully concentrated in vacuo. The oily residue, after repeated trituration with ether, gives 14 grams of free ester which is used directly in the above-described mixture; amorphous powder, difficulty soluble in ethyl acetate (soluble in the presence of 10/ of methanol), easily sluble in tetrahydrofuran and acetonitrile.

(b) *Starting from L-seryl-L-tyrosyl-L-serine methyl ester.*—2.0 grams (4 millimols) of carbobenzoxy-L-seryl-L-tyrosyl-L-serine methyl ester [K. Hofmann et al., J. Am. Chem. Soc., vol. 19, 1636 (1957); St. Guttmann and R. A. Boissonnas, Helv. Chim. Acta, vol. 41, 1892 (1958)] are dissolved in 40 cc. of methanol and hydrogenated in the presence of 1 gram of palladium carbon (10%) at room temperature and normal pressure, the carbon dioxide formed being absorbed in caustic soda solution. After absorption of the calculated quantity of hydrogen (20 minutes) hydrogenation is terminated and the solution filtered off from the catalyst is evaporated in vacuo. On trituration of the residue with acetonitrile, the L-seryl-L-tyrosyl-L-serine methyl ester crystallizes in the form of fine needles: 1.21 grams (82%); M.P. 155–158° C.; after recrystallization from water or a little alcohol: M.P. 158–160° C.; $[\alpha]_D$ +4.6°±1° (c.=3.91 in methanol); +11.5°±1° (c.=2.00 in 0.1 N-hydrochloric acid in methanol); literature value for hydrochloride: +10.2° (c.=2.6 in methanol). The substance is found to be uniform by paper chromatography.

239 mg. (1 millimol) of t-btyloxycarbonyl-p-nitrophenol are added to a solution of 369 mg. (1 millimol) of L-seryl-L-tyrosyl-L-serine methyl ester in 2 cc. of dry pyridine and allowed to stand overnight at 20° C. The reaction solution is evaporated carefully in vacuo, the residue is dissolved in ethyl acetate and worked up further as described under (a); crude product after trituration with ether: 295 mg. (63%); after recrystallization from acetone: 233 mg. (50%), M.P. 123–126° C.; $[\alpha]_D$ —23.1°±1° (c.=2.04 in methanol).

If 0.36 gram (2.5 millimols) of t-butyloxycarbonyl azide is used instead of t-butyloxycarbonyl-p-nitrophenol, 305 mg. (69%) of crude product or 245 mg. (52%) of pure substance are obtained.

Example 4.—t-Butyloxycarbonyl-L-seryl-L-tyrosyl-L-serine-hydrazide 5 cc. of hydrazine hydrate are added to a solution of 14 grams (30 millimols) of crude t-butyloxycarbonyl-L-seryl-L-tyrosyl-L-serine methyl ester in 100 cc. of methanol and allowed to stand at room temperature. After a short time, the separation of amorphous hydrazide begins and this is filtered off after 6 hours, washed with methanol and dried overnight at 0.01 mm. over concentrated sulfuric acid to remove traces of hydrazine: 11.8 grams, M.P. 173–176° C. By recrystallization from water, the hydrazide monohydrate is obtained in the form of felty needles having a melting point of 184–187° C. (after sintering at 150° C.); $[\alpha]_D$ —3.4°±1° (c.=1.76 in dimethylformamide), —24.9°±1° (c=2.18 in glacial acetic acid-water in the ratio of 1:1), —9°±1° (c.=1.01 in pyridine).

When pure starting material is used, the yield of recrystallized hydrazide is 75%.

Example 5.—t - Butyloxycarbonyl - L - seryl - L - tyrosyl- L - seryl - L - methionyl - L - glutaminyl - L - histidyl-L-phenylalanyl-L-arginyl-L-tryptophyl glycine acetate 487 mg. (1 millimol) of BOC-seryl-tyrosyl-serine hydrazide with 1 molecule of water of crystallization are rapidly dissolved in 3 cc. of 1 N-hydrochloric acid previously cooled to —10° C. (containing 10% of sodium chloride to lower the freezing point) and 0.24 cc. (1.2 equiv.) of a 5 N aqueous sodium nitrite solution likewise previously cooled is added dropwise. The azide formed is precipitated immediately as a dense cheesy deposit. The reaction solution is covered with a layer of 5 cc. of ethyl acetate cooled to —10° C. and is allowed to react for 5 minutes at —10° C. The solution is then extracted twice with 10 cc. of ethyl acetate. The combined ethyl acetate phases are shaken with 1 cc. of saturated sodium bicarbonate solution, washed three times with 1 cc. of ice water and dried briefly at 0° C. over magnesium sulfate. The ethyl acetate is concentrated in vacuo at room temperature to a small volume (2 cc.) and the syrupy residue is dissolved in 4 cc. of dimethyl formamide cooled to −10° C. After complete concentration of the ethyl acetate, the azide crystallizes at 0° C.; M.P.=(50° C.) 135–150° C.; from ether with partial decomposition.

At the same time, 520 mg. (0.5 millimol) of L-methionyl-L-glutaminyl-L-histidyl - L - phenylalanyl - L-arginyl-L-tryptophyl glycine (cf. U.S. patent application Serial No. 91651 filed February 27, 1961 by Robert Schwyzer et al.) are dissolved in 7.5 cc. of dimethyl formamide with slight heating, the solution is cooled to room temperature, 0.76 cc. of a 10% solution of triethylamine in dimethyl formamide (0.55 millimol) is added thereto and the freshly prepared azide solution is added to the solution cooled to −10° C. The reaction solution is allowed to react for 2 days at 0° C., again cooled to −10° C. and neutralized with 0.275 cc. of 1 N hydrochloric acid. The crude reaction product is precipitated by adding a large quantity of ethyl acetate, filtered and dried with a high vacuum over phosphorus pentoxide. The yield is 720 mg. of crude butyloxycarbonyl decapeptide acetate, which indicates in the paper chromatogram only approximately 5% of a slowly migrating, Pauli-positive substance.

The analysis preparation melts after being crystallized once from methanol at 202° C. with decomposition. The acetyl determination shows only ½ mol of acetic acid as acetate, referred to arginine.

The $R_f$-values in systems 43, 45 and 54 are 0.69, 0.60 and 0.72.

*Example 6. — L - seryl-L-tyrosyl-L-seryl-L-methionyl-L-glutaminyl-L-histidyl-L-phenylalanyl - L - arginyl - L - tryptophyl-L-glycine acetate*

125 mg. of BOC-decapeptide are allowed to stand with 1.5 ml. of anhydrous trifluoroacetic acid for one hour at room temperature. The trifluoroacetic acid is evaporated in vacuo at 40° C. and the syrupy residue is triturated repeatedly with large quantity of absolute ether. The trifluoroacetate of the decapeptide is obtained as a slightly pink-colored powder.

The dried compound is dissolved in 1 ml. of water and washed with another 30 ml. of water through an ion-exchange column IR–4B (acetate form).

After evaporation of the water, the glassy residue is dissolved in a little methanol and decapeptide is precipitated in acetone. 100 mg. of Seryl-tyrosyl-seryl-methionyl - glutaminyl - histidyl - phenylalanyl - arginyl-tryptophyl-glycine acetate are obtained. M.P. 192–194° C.

In the paper chromatogram, the decapeptide shows the following $R_f$-values in systems 45, 50 and 54: 0.51; 0.47 and 0.58, respectively. In the test according to Saffran and Schally, it shows a strong CRF activity.

*Example 7. — t - Butyloxycarbonyl-L-seryl-L-tyrosyl-L-seryl-L-methionine methyl ester*

1.53 grams (10 ml) of freshly distilled L-methionine methyl ester are added to a solution of L-butyloxycarbonyl-L-seryl-L-tyrosyl-L-serine azide freshly prepared from 2.44 grams (5 millimols) of t-butyloxycarbonyl-L-seryl-L-tyrosyl-L-serine hydrazide monohydrate according to Example 6 in 30 ml. of ethyl acetate and allowed to stand for 48 hours at 0° C. The reaction product precipitated as jelly is filtered off and washed with ethyl acetate and ether: 1.89 grams; from the filtrate, after conventional working up, another 0.25 gram of substance is obtained (total 2.14 grams=21%). Dissolution in and reprecipitation from ethyl acetate yields 1.57 grams (52%) of amorphous t-butyloxycarbonyl - L - seryl-L-tyrosyl-L-seryl-L-methionine methyl ester melting unsharply at about 115–125° C.; $[\alpha]_D$−29.8°±1° (c.=2.12 in methanol).

*Example 8. — t - Butyloxycarbonyl - L - seryl-L-tyrosyl-L-seryl-L-methionine hydrazide*

0.90 gram (1.5 millimols) of t-butyloxycarbonyl-L-seryl-L-tyrosyl-L-seryl-L-methionine methyl ester is dissolved in 10 ml. of methanol and 0.25 ml. of hydrazine hydrate is added. After 18 hours, the precipitated amorphous hydrazide is filtered off and washed with methanol: 0.81 gram (90%), M.P. 185–188° C. (sintering at 178° C.). The crude product is triturated with water to remove traces of hydrazine and thereupon dissolved in and recipitated from methanol: 0.75 gram (83%), M.P. 191–193° C.; $[\alpha]_D^{25}$−36.7°±1° (c.=2.02 in water-methanol in the ratio of 1:1).

*Example 9.—γ-t-Butyl-L-glutamyl-L-histidyl-L-phenylalanyl-L-arginyl-L-trypotphyl-glycine*

975 mg. (0.9 millimol) of carbobenzoxy-(γ-t-butyl)-L-glutamyl-L-histidyl-L-phenylalanyl-nitro-L-arginyl - L-tryptophyl-glycine (U.S. patent application Serial No. 114,609 filed June 5, 1961, by Robert Schwyzer et al. are agitated in 100 cc. of acetic acid of 90% strength in the presence of 400 mg. of palladium carbon (10%) catalyst for 17 hours under atmospheric pressure and at room temperature in a hydrogen atmosphere. The solution is freed from the catalyst and evaporated to dryness in vacuo at 40° C., and the residue precipitated once from a mixture of methanol and ether. After drying in a high vacuum there are obtained 845 mg. of hexapeptide-γ-tertiary butyl ester.

In the ultraviolet spectrum:

$\lambda$ max=290 m$\mu$ ($\epsilon$=4800)
$\lambda$ max=280 m$\mu$ ($\epsilon$=5800)
$\lambda$ max=274 m$\mu$ ($\epsilon$=5700)

In high voltage electrophoresis the peptide derivative travels at 3000 volts and pH 1.9 within 1 hour 14.5 cm. and shows a positive reaction with Pauly, Ehrlich and Sakaguchi reagents and with ninhydrin.

*Example 10. — t - Butyloxycarbonyl-L-seryl-L-tyrosyl-L-seryl - L - methionyl-(γ-t-butyl)-L-glutamyl-L-histidyl-L-phenylalanyl-L-arginyl-L-tryptophyl-glycine*

330 mg. (0.55 millimol) of t-btuyloxycarbonyl-L-seryl-L-tyrosyl-L-seryl-L-methionine-hydrazide are dissolved in 3.5 cc. of dimethylformamide, previously cooled to −10° C., and 1.5 cc. of N-hydrochloric acid are added dropwise at that temperature. After 2 to 3 minutes 0.6 cc. of N-sodium nitrite solution, cooled to 0° C., is added slowly, and the mixture is allowed to react for 3 minutes at −5 to −10° C. 25 cc. of ice-water are then added to the reaction solution. The azide does not precipitate. By vigorous scratching with a glass rod on the wall of the vessel the azide separates as a fine crystalline precipitate. Crystallization is completed after the solution has been allowed to stand for about 20–30 minutes at 0° C. Filtration is carried out with a glass section-filter, and the residue is washed first with ice-col 0.5 N-sodium bicarbonate solution until the reaction is alkaline, and then neutral with ice-water. The azide is lyophilised in a desiccator for 2½ hours. Yield: 275 mg. (82% of the theoretical), M.P. 98–102° C. with decomposition.

The 275 mg. (0.45 millimol) of azide are added immediately and with stirring to a solution, cooled to −10° C. of 400 mg. (0.45 millimol) of γ-t-butyl-L-glutamyl-L-histidyl - L - phenylalanyl - L - arginyl - L - tryptophyl-glycine in 15 cc. of dimethylformamide, containing 0.50 millimol of triethylamine.

The mixture is allowed to react for 20 hours at 0° C., 0.2 cc. of glacial acetic acid is then added to the reaction solution, and the crude BOC-decapeptide is then precipitated with ample ethyl acetate. Yield: 580 mg. (89%), M.P.=192–193° C. with decomposition.

The crude peptide derivative recrystallized from 30 cc. of methanol of 90% strength yields 450 mg. of pure BOC-decapeptide, M.P. 203° C. with decomposition.

In the paper chromatogram in systems 43 and 45, the BOC-decapeptide shows the following $R_f$-values 43/0.74 and 45/0.70.

When the BOC-decapeptide is split with anhydrous trifluoroacetic acid, the free decapeptide is obtained which, in high voltage electrophoresis, travels 12.5 cm. at 3000 volts and pH 1.9 in one hour.

What is claimed is:

1. A member selected from the group consisting of decapeptides of the formula L-seryl-L-tyrosyl-L-seryl-L-mercapto - lower alkyl - α - amino - acetyl - L - glutaminyl - L - histidyl - L - phenylalanyl - L - α - amino-lower alkyl-α-amino-acetyl-L-tryptophyl-glycine, whose mercapto group is a member of the group consisting of an unsubstituted and a lower alkyl substituted mercapto group, their esters, amides and N-acylated derivatives and acid addition salts of therapeutically useful acids.

2. A member selected from the group consisting of decapeptides of the formula L-seryl-L-tyrosyl-L-seryl-L-α-mercapto-lower alkyl-α-amino-acetyl-L-glutamyl-L-histidyl - L - phenylalanyl - L - α - amino - lower alkyl-α-amino-acetyl-L-tryptophyl-glycine whose mercapto group is a member of the group consisting of an unsubstituted and a lower alkyl substituted mercapto group, their esters, amides and N-acylated derivatives and acid addition salts of therapeutically useful acids.

3. A member selected from the group consisting of L-seryl - L - tyrosyl - L - seryl - L - methionyl - L - glutaminyl - L - histidyl - L - phenylalanyl - L - arginyl - L-tryptophyl-glycine, its esters, amides and N-acylated derivatives and acid addition salts of therapeutically useful acids.

4. A member selected from the group consisting of L - seryl - L - tyrosyl - L - seryl - L - methionyl - L-glutamyl - L - histidyl - L - phenylalanyl - L - arginyl - L-tryptophyl-glycine, its esters, amides and N-acylated derivatives and acid addition salts of therapeutically useful acids.

References Cited by the Examiner

Harris, Nature, vol. 178, page 90 (1956).

Hoffman, Jour. Am. Chem. Soc., vol. 79, pages 1636–41 and 6087–88 (1957).

Schwyzer, Nature, vol. 182, pages 1669–70 (1958).

Shepherd, Jour. Am. Chem. Soc., vol. 78, pages 5067–76 (1956).

White, Jour. Am. Chem. Soc., vol. 77, pages 1711–12 (1955).

LEWIS GOTTS, *Primary Examiner.*

LEON ZITVER, *Examiner.*

DENNIS P. CLARKE, PERRY A. STITH,
*Assistant Examiners.*